United States Patent [19]

Holler et al.

[11] Patent Number: 5,721,893
[45] Date of Patent: Feb. 24, 1998

[54] EXPLOITING UNTAGGED BRANCH PREDICTION CACHE BY RELOCATING BRANCHES

[75] Inventors: Anne M. Holler, San Jose; Lacky V. Shah, Fremont, both of Calif.

[73] Assignee: Hewlett-Packard Company, Palo Alto, Calif.

[21] Appl. No.: 649,142

[22] Filed: May 14, 1996

[51] Int. Cl.[6] .................................................. G06F 9/45
[52] U.S. Cl. .......................... 395/586; 395/580; 395/587; 395/708; 395/709
[58] Field of Search ................................ 395/708, 709, 395/580, 586, 587

[56] References Cited

U.S. PATENT DOCUMENTS

| | | | |
|---|---|---|---|
| 5,450,588 | 9/1995 | Hoxey | 395/709 |
| 5,511,198 | 4/1996 | Hotta | 395/709 |
| 5,530,964 | 6/1996 | Alpert et al. | 395/709 |
| 5,568,623 | 10/1996 | Ogawa | 395/392 |
| 5,596,732 | 1/1997 | Hosoi | 395/709 |
| 5,655,122 | 8/1997 | Wu | 395/705 |

OTHER PUBLICATIONS

Patterson, David A. et al., "Computer Architecture A Quantitative Approach", Second Edition, Chapter 4, Advances Pipefining and Instruction–Level Parallelism, Section 4.3, Reducing Branch Penalties with Dynamic Hardware Prediction, pp. 262–278.

Pan, Shien–Tai et al., "Improving the Accuracy of Dynamic Branch Prediction Using Branch Correlation," ASPLOS V — Oct. 1992.

Lee et al., "Branch Prediction Strategies and Branch Target Buffer Design," Computer, Jan. 1984, pp. 6–22.

Smith, James E., "A Study of Branch Prediction Strategies," 1981 IEEE, pp. 135–148.

*Primary Examiner*—Kenneth S. Kim

[57] ABSTRACT

An untagged branch prediction cache is exploited by relocating branches during a final pass in the compilation process, after all other optimizations have been applied, where a pass is made over the instructions in each subprogram, and all branches that use the branch prediction cache (BPC) are placed into buckets, where each bucket corresponds to a position in the BPC. Recorded with each branch is its expected direction (taken, not taken), based either on profiling data or on static heuristics. Each bucket is then inspected. For buckets containing branches whose predicted directions conflict, an attempt is made to move some of those branches to another bucket. If other branches' positions are affected, the bucket inspection process is restarted, after recalculation of the bucket positions of all BPC branches. Branches that have matching predicted directions, but that currently fall into separate buckets, may be moved into the same bucket, so that the histories of branches can reinforce one another. Heuristics may be used to dictate which branches are considered, what code transformations are used to relocate branches, and whether both conflict avoidance and match enhancement are performed.

25 Claims, 4 Drawing Sheets

EXPLOITING UNTAGGED BRANCH PREDICTION CACHE BY RELOCATING BRANCHES

BACKGROUND OF THE INVENTION

1. Technical Field

The invention relates to computers. More particularly, the invention relates to an improved branch prediction strategy for a compiler.

2. Description of the Prior Art

In modern superscalar computers, branch instructions can present considerable delay and loss of potential performance, unless their direction (i.e. taken, not taken) can be accurately predicted. This is because the processor must idle other operations while it is trying to compute where the branch goes. If the processor can predict where the branch could go, it can fetch from the branch and there can be no penalty for the branch operation.

A branch prediction cache (BPC) is a hardware construct that aids in accurate branch prediction by storing such information as recent branch execution history for a subset of a program's branches. This information is then used to anticipate the direction a branch is to take. A particular branch's history is accessed using some function of that branch's address. The function may map several distinct branch addresses to the same entry on a table. An untagged BPC cannot distinguish between the history of multiple branches and, therefore, the branches' histories are combined.

Unfortunately, when multiple branches which have different taken-not taken patterns of execution map to the same entry in the BPC, their histories may interfere, resulting in inaccurate prediction of the branches and an associated performance penalty. In addition, when multiple branches which have similar taken/not taken patterns of execution map to different entries in the BPC, an opportunity is missed to let the branches' histories reinforce one another. Such reinforcement can improve prediction accuracy, and may also free up a BPC slot for use by other branches.

Prior art solutions have primarily involved hardware strategies. For example, the size of the BPC may be increased to reduce the likelihood of conflicts, or tags may be added to the BPC so that branches which map to the same location can be differentiated. Two-level prediction schemes may also be employed to improve the accuracy of the branch prediction by incorporating the taken/not taken status of previously executed branches into a BPC lookup table. This technique may tend to distinguish distinct branches which map to the same location. These foregoing approaches tend to increase hardware costs, require the storage of extra data, and/or require the performance of requisite comparisons. Further, the foregoing approaches do not facilitate the sharing of a common history among similar branches.

See, for example J. E. Smith, *A Study of Branch Prediction Strategies*, 8th Symposium on Computer Architecture, pp. 135–148, May 1981 (discusses branch prediction strategies with the goal of maximizing prediction accuracy); A. Smith, J. Lee, *Branch Prediction Strategies and Branch Target Buffer Design*, Computer, pp. 6–22, January 1984 (discusses a systematic approach to selecting good prediction strategies, based on 26 program address traces grouped into four IBM 370 workloads, i.e. scientific, commercial, compiler, and supervisor, and CDC 6400 and DEC PDP-11 workloads); S.-T. Pan, K. So, J. T. Rameh, *Improving the Accuracy of Dynamic Branch Prediction Using Branch Correlation*, ASPLOS, pp. 76–84, October 1992 (a correlation-based scheme improves prediction accuracy by incorporating information, not only from the history of a specific branch, but also from the history of other branches); and D. Patterson, J. Hennessy, *Computer Architecture: A Qualitative Approach*, 2d ed., pp. 262–278, Morgan Kaufmann Publishers Inc. 1996 (examination of the approaches to branch prediction that increase the accuracy of the branch prediction mechanism).

It would advantageous to provide a technique that improves the performance of a superscalar computer system without introducing any additional hardware, i.e. that improves dynamic performance using a static technique.

SUMMARY OF THE INVENTION

The invention provides a method and apparatus for exploiting an untagged branch prediction cache by relocating branches. As a final pass in the compilation process, after all other optimizations have been applied, a pass is made over the instructions in each subprogram, and all branches that use the branch prediction cache (BPC) are placed into buckets, where each bucket corresponds to a position in the BPC. Recorded with each branch is its expected direction (taken, not taken), based either on profiling data or on static heuristics. Each bucket is then inspected. For buckets containing branches whose predicted directions conflict, an attempt is made to move some of those branches to another bucket. Ideally, movement is done in a localized manner, so as not to impact the bucket positions of other branches. If other branches' positions are affected, the bucket inspection process is restarted, after recalculation of the bucket positions of all BPC branches. Branches that have matching predicted directions, but that currently fall into separate buckets, may be moved into the same bucket, so that the histories of branches can reinforce one another. Heuristics may be used to dictate which branches are considered, what code transformations are used to relocate branches, and whether both conflict avoidance and match enhancement are performed.

DETAILED DESCRIPTION OF THE INVENTION

Figure 1:
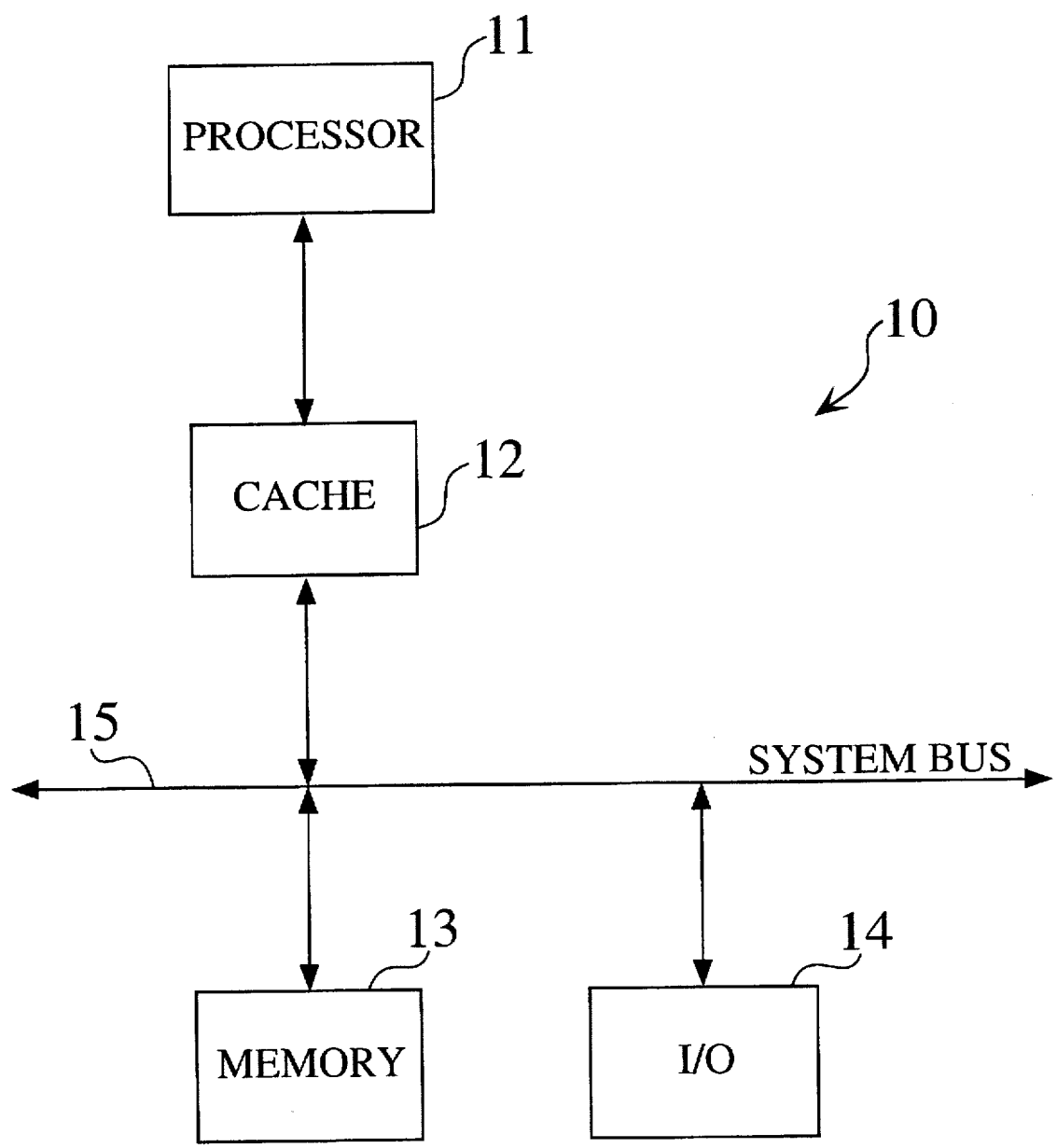
FIG. 1 is a block schematic diagram of a uniprocessor computer architecture.

FIG. 1 is a block schematic diagram of a uniprocessor computer architecture 10 including a processor cache. In the figure, a processor 11 includes a cache 12 which is in communication with a system bus 15. A system memory 13 and one or more I/O devices 14 are also in communication with the system bus.

In a compile operation, a user submits a source code program to a compiler, which is a program that runs on the computer. The compiler accepts the source code, processes the code, and produces an executable file that is optimized for a target computer architecture, e.g. computer architecture 10.

Figure 2:
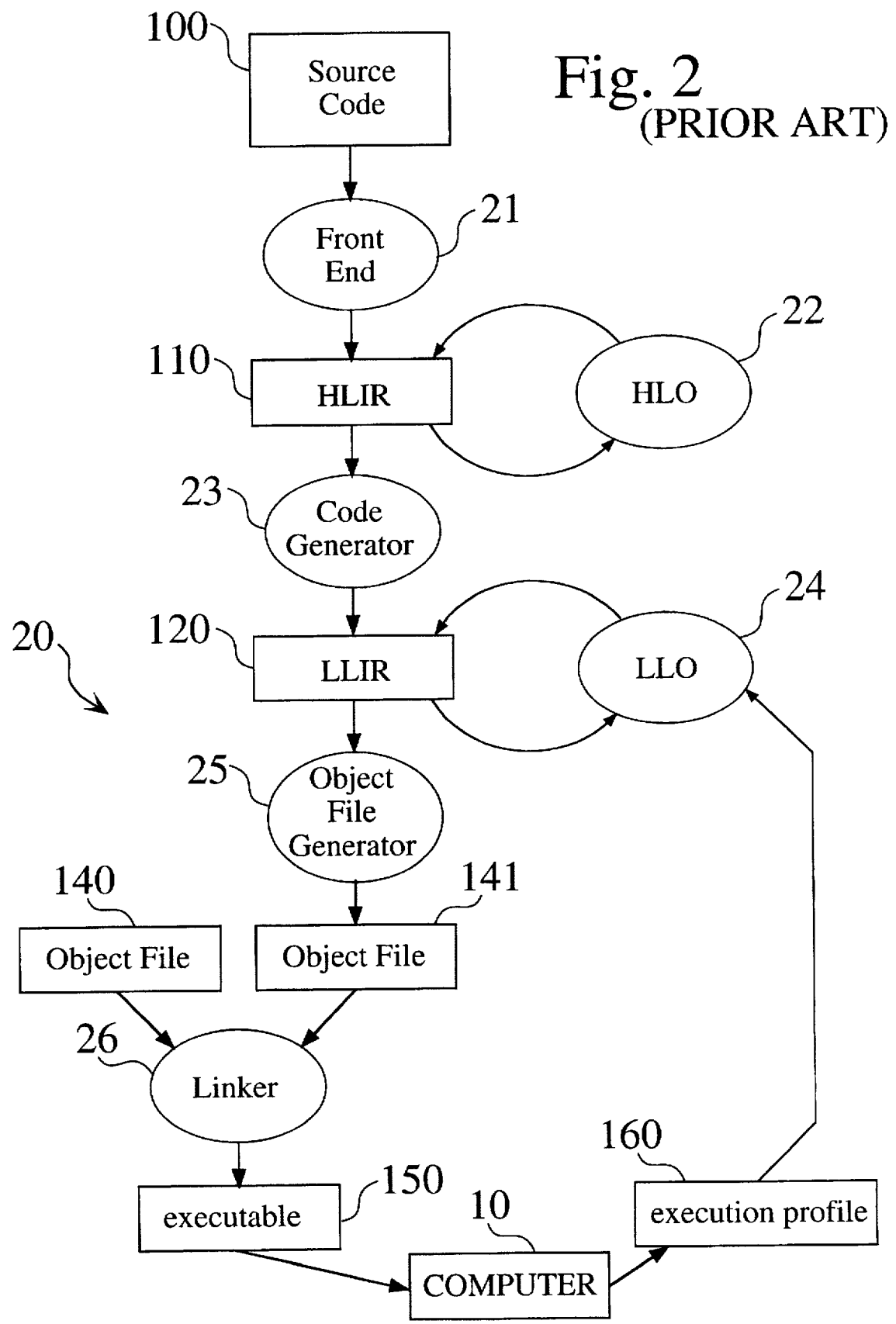
FIG. 2 is a block schematic diagram of a software compiler, for example as may be used in connection with the computer architecture shown in FIG. 1.

FIG. 2 is a block schematic diagram of a software compiler 20, for example as may be used in connection with the computer architecture 10 shown in FIG. 1. The compiler Front End component 21 reads a source code file (100) and translates it into a high level intermediate representation (110). A high level optimizer 22 optimizes the high level intermediate representation 110 into a more efficient form. A code generator 23 translates the optimized high level intermediate representation to a low level intermediate representation (120). The low level optimizer 24 converts the low level intermediate representation (120) into a more efficient (machine-executable) form. Finally, an object file generator 25 writes out the optimized low-level intermediate representation into an object files (141).

The object file (141) is processed along with other object files (140) by a linker 26 to produce an executable file (150), which can be run on the computer 10. In the invention described herein, it is assumed that the executable file (150) can be instrumented by the compiler (20) and linker (26) so that when it is run on the computer 10, an execution profile (160) may be generated, which can then be used by the low level optimizer 24 to better optimize the low-level intermediate representation (120). The compiler 20 is discussed in greater detail below.

A program is made of many procedures and it is possible that branches in one procedure conflict with branches in another procedure. The invention does not handle such conflicts directly. Rather, the invention provides a technique that examines branches within one procedure. The linker chooses how such procedures are laid out with respect to each other. One aspect of the invention is directed to some cross-procedure issues, but in general the technique herein disclosed operates on one procedure at a time.

In operation, the compiler goes through a typical compile process, i.e. compile and optimize. The technique herein then numbers every instruction in the procedure starting at zero. This, in effect, gives an address to each of the instructions. The technique herein also creates an array of buckets which are intended to symbolize the locations in the branch prediction cache into which branch instructions are placed by the system hardware. There is one bucket for each element in the system hardware branch prediction cache. The technique herein then provides a procedure that starts walking through the instructions. Whenever a branch instruction is encountered, and that branch instruction is in the category that can be predicted by the system hardware, the instruction is placed into a bucket. After all of the instructions have been placed into buckets as appropriate, conflicts are located, and conflicting instructions may be relocated based upon the application of various predetermined criteria.

There are certain branches that the system hardware does not try to predict. It predicts branches that are relative to the program counter. It does not predict branches where the target address to which they are going to branch is in a register. Accordingly, one kind of branches that are not predicted are indirect calls. Thus, the invention is applicable to branches that, if they are not taken, always go the same place, i.e. branches that only have two alternatives.

If a branch instruction that may be either taken or not taken in encountered, the technique herein drops a record that represents that instruction into the bucket that that instruction is mapped to by the system hardware. In addition to dropping a record representing that instruction into that bucket, note is made of which direction the branch is expected to go. Such expectation is based, in part, on the concept that backward branches tend to be taken because they tend to be parts of loops, while forward branches tend not to be taken because they are used to test various conditions. Thus, the invention is based in part on heuristics, i.e. educated guesses about the branches.

After a decision is made about whether or not the branch is to be taken, the instruction is put into a bucket. After all the instructions are put in buckets, if they were branches that are predictable, then the invention provides for walking through the buckets. If a bucket contains more than one branch record, and if the multiple branch records conflict in their expectations, i.e. some of them are expected to be taken and some of them are expected not to be taken, then there is a conflict on the system hardware. When such a conflict is encountered, the invention provides for attempting to move some of the conflicting branches out of the bucket. This step changes the instruction stream in the object code.

It is not always very easy to change the instruction stream. If the conflicting instructions are moved down by sticking in a no-op, then that would move all of the instructions downstream. In such case, all of the buckets that are downstream have to be reconstructed. This approach would be computationally expensive.

Hewlett-Packard Company (Palo Alto, Calif.) provides a system architecture that includes a feature that is referred to as delayed branching, in which one is allowed to put an instruction right after a branch, where the instruction is logically performed before the branch. It is possible to move the branch down and swap the two instructions, but then it is necessary to turn a bit on in the branch that indicates that the next instruction is not logically encountered before the present instruction. This mechanism allows one to move branches down without the need to move all the other branches. Unfortunately, there could already be branches in a bucket right below the current bucket, such that moving instructions down introduces new conflicts.

Figure 3:
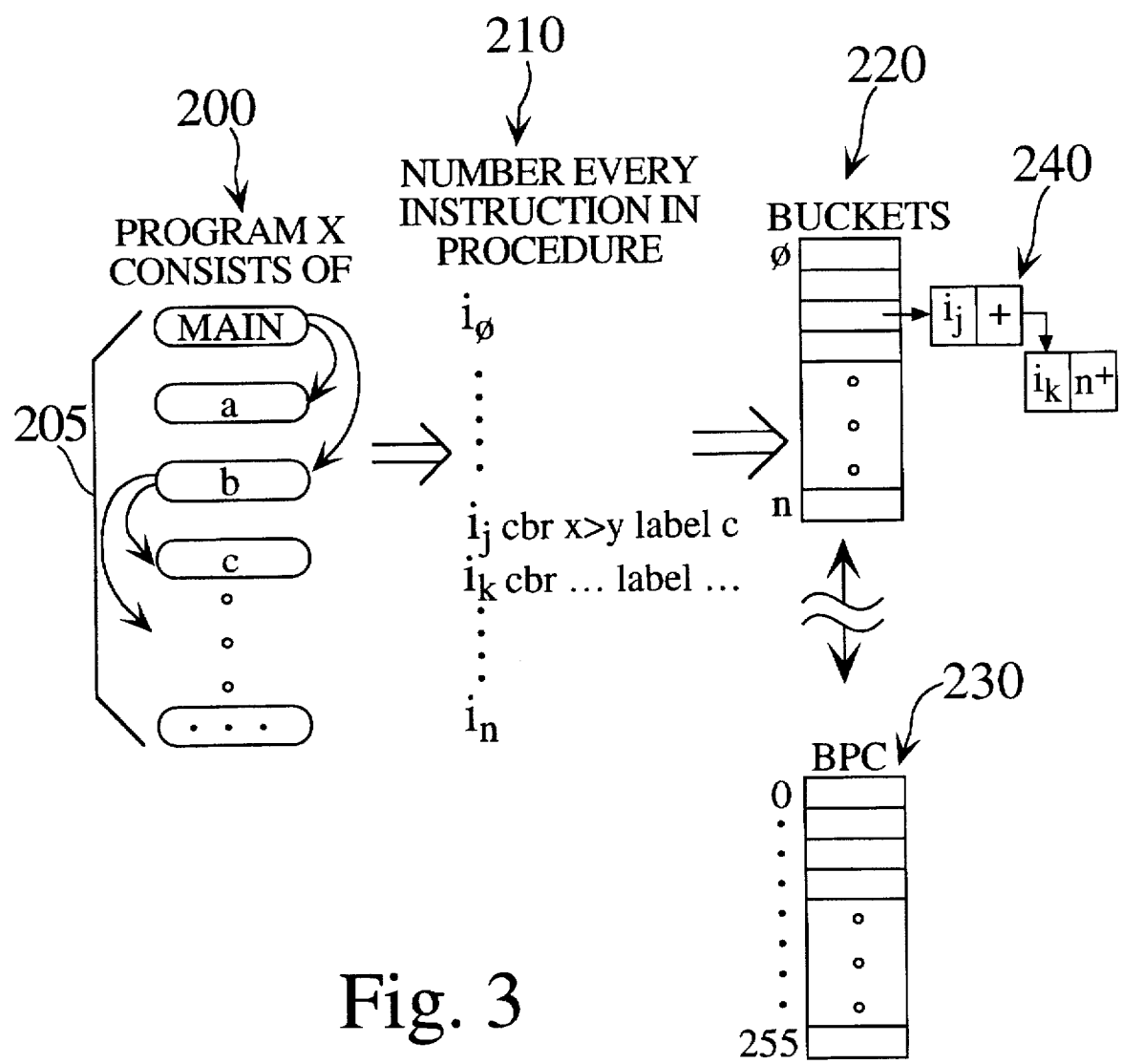
FIG. 3 is a block schematic diagram of a technique for exploiting an untagged branches prediction cache by relocating branches according to invention.

FIG. 3 is a block schematic diagram of a technique for exploiting an untagged branch prediction cache by relocating branches according to the invention. A program procedure 200 consists of a number of instructions 205. The technique herein described numbers the instructions 210 and then creates an array of buckets 220. The buckets may be thought of as pointers to a list of branches that fall into that bucket. The total number of pointers is equal in size to the system hardware branch prediction cache 230 which, on an exemplary machine, is 256 entries. The branch prediction cache could be smaller or larger, however, as appropriate for the target architecture.

Initially, each one of the buckets is empty. Once the buckets and instructions are initialized as described above, the next step is to walk through the instructions. Suppose, for example, that Instruction $i_j$ is a conditional branch if x is greater than y to label c. Such branch could either go forward or backward, such that one could expect it either to be taken or not be taken. The branch is examined and an informed determination is made as to whether the branch is going to be taken or not. The branch's address is then used to map into a bucket and a record is produced for that branch that characterizes that branch and the cache.

This process continues until another branch, $i_k$, is encountered, which is another conditional branch of another comparison to another label. Suppose that this branch is not going to be taken. This branch could potentially map into the same bucket. However, suppose it is determined that the $i_k$ instruction is not taken. Then, such instruction is labelled "nt" for not taken, while the other instruction is labelled "t"

for taken. This process of walking through the instructions is continued, noting branches and putting them into buckets.

The address module the size of the table is used by the system hardware to determine into which bucket an instruction is placed. If the address of an instruction is, for example, 257, and the branch prediction cache is numbered 0 to 255, then instruction 257 is placed at position 1 in the branch prediction cache. Thus, instructions can cause a hardware conflict if they have the same address modulo. Thus, if there are sufficient instructions in a procedure that each bucket must be used for two or more instructions, it is likely that conflicts can occur. Conversely, if the procedure altogether has fewer instructions than the number of cache lines in the hardware, it is not necessary to walk through the instructions because a conflict cannot occur.

After the invention walks through all the instructions, it is necessary to walk through the buckets. When a bucket is encountered where there is a conflict between the branches 240, then the invention seeks to resolve that conflict.

One way to avoid the conflict (as discussed above) is to get rid of one of the branches by moving it down. Thus, one heuristic dictates that if there is a match between one of the conflicting entries and the next one below, then one can move the first entry down to a next bucket, and because the entries are the same there is no conflict.

Thus, the invention makes it possible to share the history of the various branches, and can actually reinforce the history. Thus, if two instructions are alike, branch prediction is better than normal because it is not necessary to go through a period of time where the system hardware has not been trained as to the history of one branch if the two branches' history reinforce each other.

If there is already a conflict in a bucket, it is possible to look ahead, but at some point the system keeps looking ahead and looking ahead, and spends a lot of time reorganizing the buckets. Therefore, the invention preferably only looks ahead one bucket to see if either of the instructions can be moved down without a conflict. If not, the invention preferably adds up the amount of conflict to see if there is anything that can be done to reduce the conflict. For example, if there is an equal amount of conflict in one bucket, but many more takens than not takens in another, subsequent bucket, then the invention can provide for moving a taken instruction down to the next bucket because doing so reduces the conflict in the second bucket, e.g. it reinforces the preference for takens. Thus, the table of buckets helps the compiler to make decisions regarding branching.

The table of buckets may be thought of as a software abstraction for what the system hardware is going to do. When the computer is running the program, the table of buckets is represented in a piece of hardware. When a branch is moved down in the table of buckets, at the system hardware level the system hardware executes the object code until it encounters the branch. The system hardware has a branch prediction cache 230 that is the same size as the bucket data structure 220. The branch prediction cache has some address bits, but not all of the address bits, and it has a notation "taken" or "not taken." In fact, the branch prediction cache remembers the last three historical events that happened with respect to that address. Thus, if that address was first taken, then it was not taken, then it was taken, the branch prediction says that taken happened more often than not taken, so taken is chosen. This allows the branch prediction cache to adapt as history changes.

Figure 4:
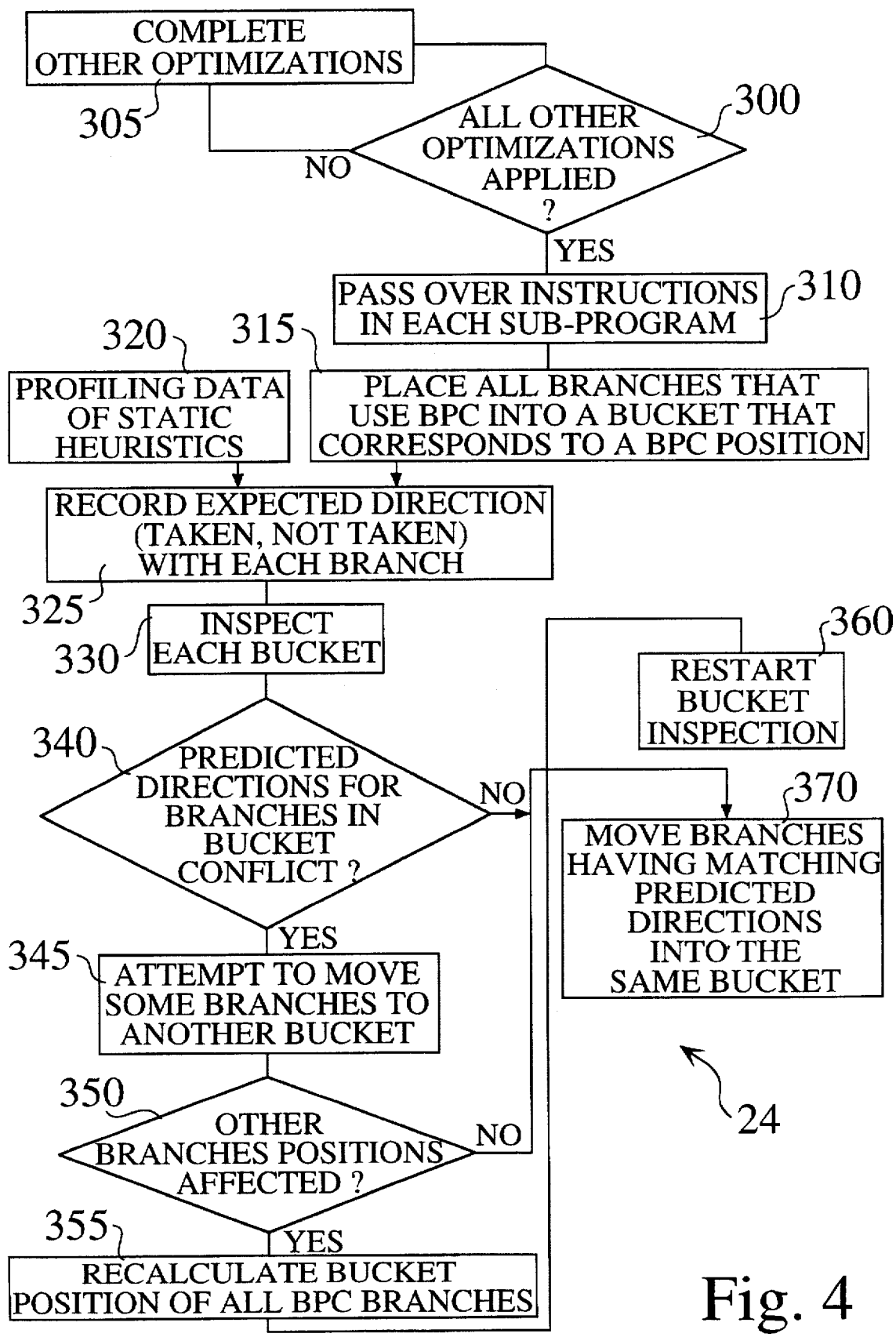
FIG. 4 is a flow diagram of the technique for exploiting an untagged branch prediction cache by relocating branches according to the invention.

FIG. 4 is a flow diagram of the technique for exploiting an untagged branch prediction cache by relocating branches according to the invention. As shown on FIG. 4, the invention is preferably associated with the low level optimizer 24 because it is necessary that the technique herein use the exact addresses at which instructions are placed if it is to be effective. It is not otherwise possible to know such addresses until the very end of the compilation process, when the object code that is going to be run on the machine is available.

As a final pass in the compilation process, after all other optimizations have been applied (300), a pass is made over the instructions in each subprogram (310), and all branches that use the branch prediction cache (BPC) are placed into buckets (315), where each bucket corresponds to a position in the BPC. Recorded with each branch is its expected direction (taken, not taken) (325), based either on profiling data or on static heuristics (320). Each bucket is then inspected (330). For buckets containing branches whose predicted directions conflict (340), an attempt is made to move some of those branches to another bucket (345). Ideally, movement is done in a localized manner, so as not to impact the bucket positions of other branches. If other branches' positions are affected (350), the bucket inspection process is restarted (360), after recalculation of the bucket positions of all BPC branches (355). Branches that have matching predicted directions, but that currently fall into separate buckets, may be moved into the same bucket (370), so that the histories of branches can reinforce one another. Heuristics may be used to dictate which branches are considered, what code transformations are used to relocate branches, and whether both conflict avoidance and match enhancement are performed.

The following is a pseudocode example of a routine for exploiting untagged branch prediction cache by relocating branches:

1 For each procedure in program
2 Compile and optimize code for procedure
3 Number instructions in procedure starting at 0
4 Create array of buckets, length of array is branch prediction cache size
5 For each instruction in procedure
6 If branch instruction and to be predicted by hardware,
7 Put in bucket for instruction number modulo branch prediction cache size
8 Note direction branch expected to go
9 For each bucket
10 If bucket contains more than one branch and if the directions conflict
11 Attempt to move some of the conflicting branches to the next bucket Thus, the invention performs branch predictions on procedures from a program by taking the lines of instructions from a procedure and numerically ordering them. The invention then looks for branching instructions and assign the branching instructions to a bucket array based on a modulo number. This array is only so large, and there may be more instructions than buckets in the array. If there are not more instructions than buckets in the array, there is never going to be a conflict, and the invention puts the branch instructions in the buckets.

However, in many cases the number of instructions is larger than the number of positions in the bucket array. After a while, some of the buckets might contain branch instructions that conflict with each other. If there is a conflict, it is necessary to make a choice about either moving a conflicting instruction down in the bucket array if that location contains the same instruction branch, or if the location below is empty. Where the location below presents another conflict, it is necessary to decide if it is useful to move the branch instruction. The branch prediction cache can collect this branching information as the code runs and can generate a history as to what actually happens as the code is being processed because, as data is entered into the program, the branches are going to be different than those encountered during compiling because the compiler was not using real data.

In an alternative embodiment of the invention, it is possible to use another convention tries to get takens into odd buckets and not takens into even buckets. Thus, it is possible to work within the array to organize the branches in a predetermined scheme that makes better use of the system hardware.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A method for exploiting an untagged branch prediction cache, comprising the steps of:

passing over a subprogram's instructions during a final optimization pass as part of a compilation process, after all other optimizations of said compilation process have been applied;

placing all branch instructions that use a branch prediction cache (BPC) into buckets, where each bucket corresponds to a position in said BPC;

recording in said buckets with each branch instruction an expected direction (taken, not taken), based either on either of profiling data or static heuristics;

inspecting each bucket; and for buckets containing branch instructions whose predicted directions conflict, moving one or more of said conflicting branch instructions to another bucket if said move reduces or eliminates said conflict at said bucket without creating or exacerbating another conflict at said other bucket, wherein moving said one or more conflicting branch instructions to another bucket changes a respective instruction position in a corresponding object code instruction stream.

2. The method of claim 1, further comprising the steps of:

recalculating the bucket positions of all BPC branch instructions; and restarting said bucket inspection process.

3. The method of claim 1, further comprising the steps of:

moving branch instructions that have matching predicted directions, but that currently fall into separate buckets, into the same bucket, wherein said branch instruction histories reinforce one another.

4. An apparatus for exploiting an untagged branch prediction cache, comprising:

a compiler for passing over a subprogram's instructions during a final optimization pass as part of a compilation process, after all other optimizations of said compilation process have been applied;

said compiler placing all branch instructions that use a branch prediction cache (BPC) into buckets, where each bucket corresponds to a position in said BPC;

said compiler recording in said buckets with each branch instruction an expected direction (taken, not taken), based either on either of profiling data or static heuristics;

said compiler inspecting each bucket; and for buckets containing branch instructions whose predicted directions conflict, said compiler moving one or more of said conflicting branch instructions to another bucket if said move reduces or eliminates said conflict at said bucket without creating or exacerbating another conflict at said other bucket, wherein moving said one or more conflicting branch instructions to another bucket changes a respective instruction position in a corresponding object code instruction stream.

5. The apparatus of claim 4, further comprising:

means for recalculating the bucket positions of all BPC branch instructions; and means for restarting said bucket inspection process.

6. The apparatus of claim 4, wherein branch instructions that have matching predicted directions, but that currently fall into separate buckets, are moved into the same bucket, wherein said branch instruction histories reinforce one another.

7. The apparatus of claim 4, said compiler further comprising a low level optimizer.

8. A method for exploiting untagged branch prediction cache by relocating branches, said method, for each procedure in a program, comprising the steps of:

compiling and optimizing said procedure code;

numbering each instruction in said procedure;

creating an array of buckets;

putting an instruction in a bucket for said instruction's number modulo branch prediction cache size for each branch instruction in said procedure that is to be predicted;

noting a direction (taken, not taken) said branch instruction is expected to go; and for each bucket, attempting to move conflicting branch instructions to a next bucket if said bucket contains more than one branch instruction and if said branch instruction directions conflict, wherein moving said one or more conflicting branch instructions to another bucket changes a respective instruction position in a corresponding object code instruction stream.

9. The method of claim 8, wherein said bucket array length is equal to a branch prediction cache size.

10. The method of claim 8, further comprising the step of:

noting which direction a branch instruction is expected to go.

11. The method of claim 10, wherein backward branches tend to be taken and forward branches tend not to be taken.

12. The method of claim 8, further comprising the step of: using two branches' history to reinforce each other.

13. The method of claim 8, further comprising the step of: adding up an amount of conflict to determine if it is possible to reduce the conflict.

14. The method of claim 13, further comprising the step of:

moving an instruction down to a next bucket to reduces conflict in said next bucket by reinforcing a direction preference.

15. The method of claim 8, further comprising the step of:

providing a system hardware branch prediction cache that is a same size as said array of buckets.

16. The method of claim 15, wherein said branch prediction cache remembers a plurality of recent historical events with respect to a particular address, such that said branch prediction cache adapts as branch history changes.

17. An apparatus for exploiting untagged branch prediction cache by relocating branches, said apparatus, for each procedure in a program, comprising:

a compiler for compiling and optimizing said procedure code;

said compiler numbering each instruction in said procedure;

said compiler creating an array of buckets;

said compiler putting an instruction in a bucket for said instruction's number modulo branch prediction cache size for each branch instruction in said procedure that is to be predicted;

said compiler noting a direction (taken, not taken) said branch instruction is expected to go; and for each bucket, said compiler attempting to move conflicting branch instructions to a next bucket if said bucket contains more than one branch instruction and if said branch instruction directions conflict, wherein moving said one or more conflicting branch instructions to another bucket changes a respective instruction position in a corresponding object code instruction stream.

18. The apparatus of claim 17, wherein said bucket array length is equal to a branch prediction cache size.

19. The apparatus of claim 17, said compiler noting which direction a branch instruction is expected to go.

20. The apparatus of claim 19, wherein backward branches tend to be taken and forward branches tend not to be taken.

21. The apparatus of claim 17, said compiler using two branches' history to reinforce each other.

22. The apparatus of claim 17, said compiler adding up an amount of conflict to determine if it is possible to reduce the conflict.

23. The apparatus of claim 22, said compiler moving an instruction down to a next bucket to reduces conflict in said next bucket by reinforcing a direction preference.

24. The apparatus of claim 17, further comprising:

a system hardware branch prediction cache that is a same size as said array of buckets.

25. The apparatus of claim 24, wherein said branch prediction cache remembers a plurality of recent historical events with respect to a particular address, such that said branch prediction cache adapts as branch history changes.

* * * * *